US009020712B2

(12) United States Patent
Koike et al.

(10) Patent No.: US 9,020,712 B2
(45) Date of Patent: Apr. 28, 2015

(54) VEHICLE CONTROL DEVICE

(71) Applicant: Honda Motor Co., Ltd., Minato-ku, Tokyo (JP)

(72) Inventors: Masaki Koike, Wako (JP); Kohei Akamine, Wako (JP); Hisashi Ishikawa, Wako (JP); Shinichiro Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/278,551

(22) Filed: May 15, 2014

(65) Prior Publication Data

US 2014/0350806 A1 Nov. 27, 2014

(30) Foreign Application Priority Data

May 23, 2013 (JP) ................................. 2013-109411

(51) Int. Cl.
*B60W 10/11* (2012.01)
*B60W 10/18* (2012.01)

(52) U.S. Cl.
CPC ............. *B60W 10/11* (2013.01); *B60W 10/182* (2013.01)

(58) Field of Classification Search
CPC . B60W 10/11; B60W 10/182; B60W 10/184; B60W 2510/10; B60W 2710/186
USPC ........................................................ 701/53
See application file for complete search history.

(56) References Cited

U.S. PATENT DOCUMENTS

2012/0078478 A1* 3/2012 Spaulding et al. ............... 701/53
2012/0330524 A1* 12/2012 Rahman et al. .................. 701/70
2013/0073163 A1* 3/2013 Liu et al. .......................... 701/70

FOREIGN PATENT DOCUMENTS

JP 2007-255490 A 10/2007
JP 2008-207638 A 9/2008

OTHER PUBLICATIONS

Notification of Reasons for Refusal issued to corresponding JP Patent Application 2013-109411 and dated Mar. 3, 2015.

* cited by examiner

*Primary Examiner* — Edwin A Young
(74) *Attorney, Agent, or Firm* — Carrier Blackman & Associates, P.C.; Joseph P. Carrier; William D. Blackman

(57) ABSTRACT

In order to enable a transmission to reliably perform a switching to a parking range thereof, a vehicle control device includes a shift-by-wire device which switches a shift range of a transmission mounted on a vehicle in accordance with a request by an electric signal, an acceptance unit which accepts a request for switching to a parking range of the transmission, a detection unit which detects that switching to the parking range of the transmission has been settled, and a braking device which generates a braking force when the acceptance unit accepts a request for switching to the parking range of the transmission, from the time of acceptance of the request for switching until the detection unit detects settlement of the switching to the parking range.

6 Claims, 11 Drawing Sheets

VEHICLE CONTROL DEVICE

CROSS-REFERENCE TO RELATED APPLICATION

This application is based upon and claims the benefit of priority to the prior Japanese Patent Application No. 2013-109411, filed on May 23, 2013, the entire contents of which are incorporated herein by reference.

TECHNICAL FIELD

The present invention relates to a vehicle control device that generates braking force to the vehicle when switching a transmission to a parking range.

BACKGROUND ART

In recent years, as a shift device for an automatic transmission mounted on a vehicle, one of a so-called shift-by-wire system has attracted attention, which is advantageous in downsizing of the device, a reduction in operation force and electronic control. The shift-by-wire system is a switching system by a so-called electric control, in which a sensor or the like detects a shift position in a shift operation unit and then a speed change control device transmits a switching signal to an actuator of the automatic transmission based on the detected signal to thereby switch the range of the automatic transmission.

Here, examples of the common selection range in an automatic transmission include a neutral range, a drive range, a reverse range and a low range. Shift positions in the shift operation unit of the shift-by-wire system also include a neutral position, a drive position, a reverse position and a low position in accordance with each range, respectively.

Moreover, the selection range in the automatic transmission includes a parking range which locks the automatic transmission. This parking range is selected with a parking position provided in the shift operation unit being chosen by a driver by means of a shift lever, or with a parking switch provided separately being depressed by a driver.

Patent document 1 describes an example of the shift device of such a shift-by-wire system and in particular, discloses a technique of preventing abrupt deceleration of a vehicle from being caused when a parking switch is depressed or the like while the vehicle is moving at a predetermined speed.

PRIOR ART DOCUMENTS

Patent Document

Patent document 1: Japanese Patent Application Publication No. 2007-255490

SUMMARY OF THE INVENTION

Problems to be Solved by the Invention

However, in such a conventional technique as described in Patent document 1, when the parking switch is depressed or the like to generate a request for switching to the parking range of the automatic transmission in the state of a vehicle being stopped, a response time for switching to the parking range is required and thus a problem has occurred in that the vehicle may possibly set into motion until the parking range of the automatic transmission is settled.

The present invention has been made to solve the problems, and it is therefore an object of the present invention to provide a vehicle control device that can reliably perform a switching of a transmission to a parking range.

Means for Solving the Problems

In order to solve the above problems, the present invention provides a vehicle control device including: a shift-by-wire device which switches a shift range of a transmission mounted on a vehicle in accordance with a request by an electric signal; an acceptance unit which accepts a request for switching to a parking range of the transmission; a detection unit which detects that switching to the parking range of the transmission has been settled; and a braking device which generates a braking force when the acceptance unit accepts a request for switching to the parking range of the transmission, from the time of acceptance of the request for switching until the detection unit detects settlement of the switching to the parking range.

According to the present invention, it is possible to prevent the vehicle from setting into motion until the parking range of the transmission is settled to lock the output shaft.

The present invention may be configured so that the braking device generates the braking force for a predetermined time, and decreases the braking force when the predetermined time elapses even if the detection unit does not detect the settlement of the switching to the parking range.

According to the present invention, it is possible to inform a driver of a failure occurring in the function of switching to the parking range of the transmission, or the like.

The present invention may be configured so that in operation of a hill start assist control that generates a braking force for a predetermined time while the vehicle is stopping on a hill, the braking device continues generation of the braking force after elapse of the predetermined time when the request for switching to the parking range is done based on the request.

According to the present invention, it is possible to prevent the vehicle from setting into motion while using the processing of switching to the parking range of the transmission in conjunction with the hill start assist control.

The present invention may be configured so that in operation of an automatic brake hold control that generates a braking force while the vehicle is stopping, the braking device generates a braking force based on the automatic brake hold control when the request for switching is done.

According to the present invention, it is possible to use the automatic brake hold control regardless of the processing of switching to the parking range of the transmission.

The present invention may be configured so that in operation of a low speed following control, even when the acceptance unit accepts a request for switching to the parking range of the transmission, the braking device does not generate a braking force based on the request for switching.

According to the present invention, it is possible to use the low speed following control regardless of the processing of switching to the parking range of the transmission.

The present invention may be configured so that the braking device holds the braking force at a first predetermined pressure and then holds the braking force at a second predetermined pressure lower than the first predetermined pressure.

According to the present invention, it is possible to remove a feeling of strangeness given to the driver by reducing a pitching behavior of the vehicle due to braking on a hill or the like.

Advantageous Effects of the Invention

The vehicle control device according to the present invention can prevent the vehicle from setting into motion until the parking range of the automatic transmission is settled to lock the output shaft.

EMBODIMENTS OF THE INVENTION

Hereinafter, a vehicle control device according to an embodiment of the present invention will be described in detail with reference to the drawings.

Note that in the figures described below, members having a common function, or members having a mutually corresponding function, are given in principle a common reference sign. Moreover, for convenience of explanation, the size and shape of each member are schematically shown with deformation or inflation in some cases.

[A Braking Force Generation Device 10 which is Part of a Braking Force Control System 7 According to an Embodiment of the Present Invention]

Figure 1:
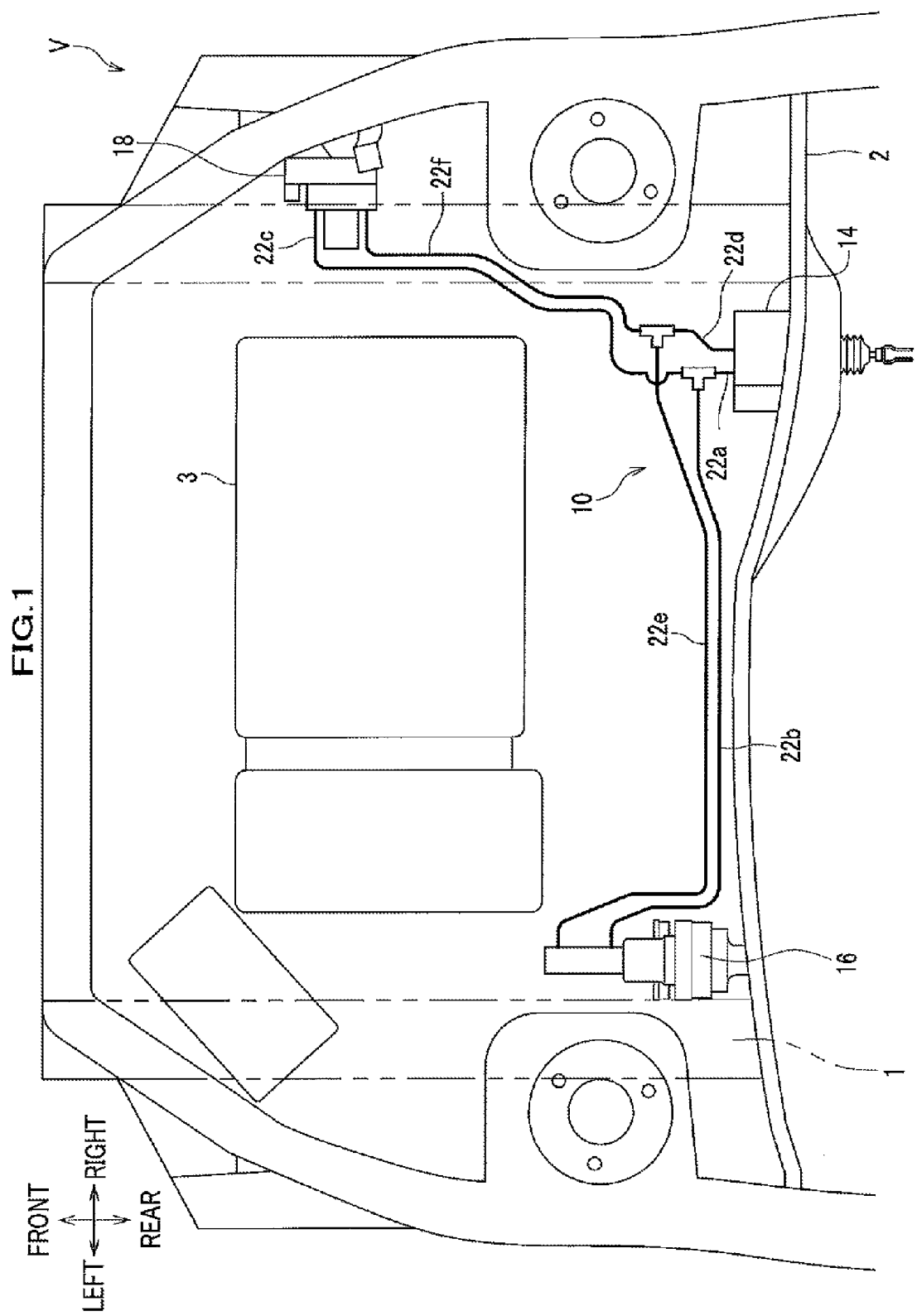
FIG. 1 is a view illustrating an example in which a braking force generation device for vehicle according to an embodiment of the present invention is mounted on the vehicle.

Firstly, with reference to FIG. 1, a description is given of an example in which the braking force generation device 10 constituting part of the braking force control system 7 according to the embodiment of the present invention is mounted on a vehicle V. FIG. 1 is a view illustrating the example in which the braking force generation device 10 is mounted on the vehicle V. Note that directions of front, rear, left and right of the vehicle V are indicated by arrow marks in FIG. 1.

The braking force generation device 10 is provided with a by-wire brake system which generates braking force by means of an electric circuit, in addition to an existing brake system which generates braking force by means of a hydraulic circuit.

As illustrated in FIG. 1, the braking force generation device 10 includes a fluid pressure generation device 14 for vehicle to which a braking operation (inclusive of a braking-giving operation and a braking-releasing operation) by a driver is inputted via a brake pedal 12 (FIG. 2), a motor cylinder device 16 which generates a brake fluid pressure based on at least an electric signal according to the braking operation, and a Vehicle Stability Assist (VSA [registered trademark]) device 18 which assists a stability of behavior of the vehicle V.

In the example illustrated in FIG. 1, the fluid pressure generation device 14 is applied to the right-side steering wheel vehicle and is fixed via a bolt or the like to the right side of a dashboard 2 in the width direction of the vehicle. Note that the fluid pressure generation device 14 may be applied to the left-side steering wheel vehicle.

In the example illustrated in FIG. 1, the motor cylinder device 16 is disposed on the left side opposite to the fluid pressure generation device 14 in the width direction of the vehicle, and is mounted via a mounting bracket (not shown) on a vehicle body 1 such as a side frame on the left side.

In the example illustrated in FIG. 1, the VSA device 18 is mounted via a mounting bracket (not shown) on a front end part of the vehicle body 1 on the right side in the width direction of the vehicle. The VSA device 18 has an Anti-lock Brake System (ABS) function that prevents wheels from being locked when a braking operation is performed, a Traction Control System (TCS) function that prevents wheels from spinning free when an acceleration is performed, a function of suppressing skid when a turning is performed, and the like. Note that the VSA device 18 may adopt a configuration that includes the ABS function alone.

The fluid pressure generation device 14, the motor cylinder device 16 and the VSA device 18 are connected to be communicated with one another via piping tubes 22a to 22f through which brake liquid flows.

The braking force generation device 10 can be applied to any of a front-wheel drive vehicle, a rear-wheel drive vehicle and a four-wheel drive vehicle. Moreover, the fluid pressure generation device 14 and the motor cylinder device 16 serving as the by-wire brake system are electrically connected via wires not shown to an ECU (Electronic Control Unit) 80 (see FIG. 3) described later.

[Schema of the Braking Force Generation Device 10]

Figure 2:
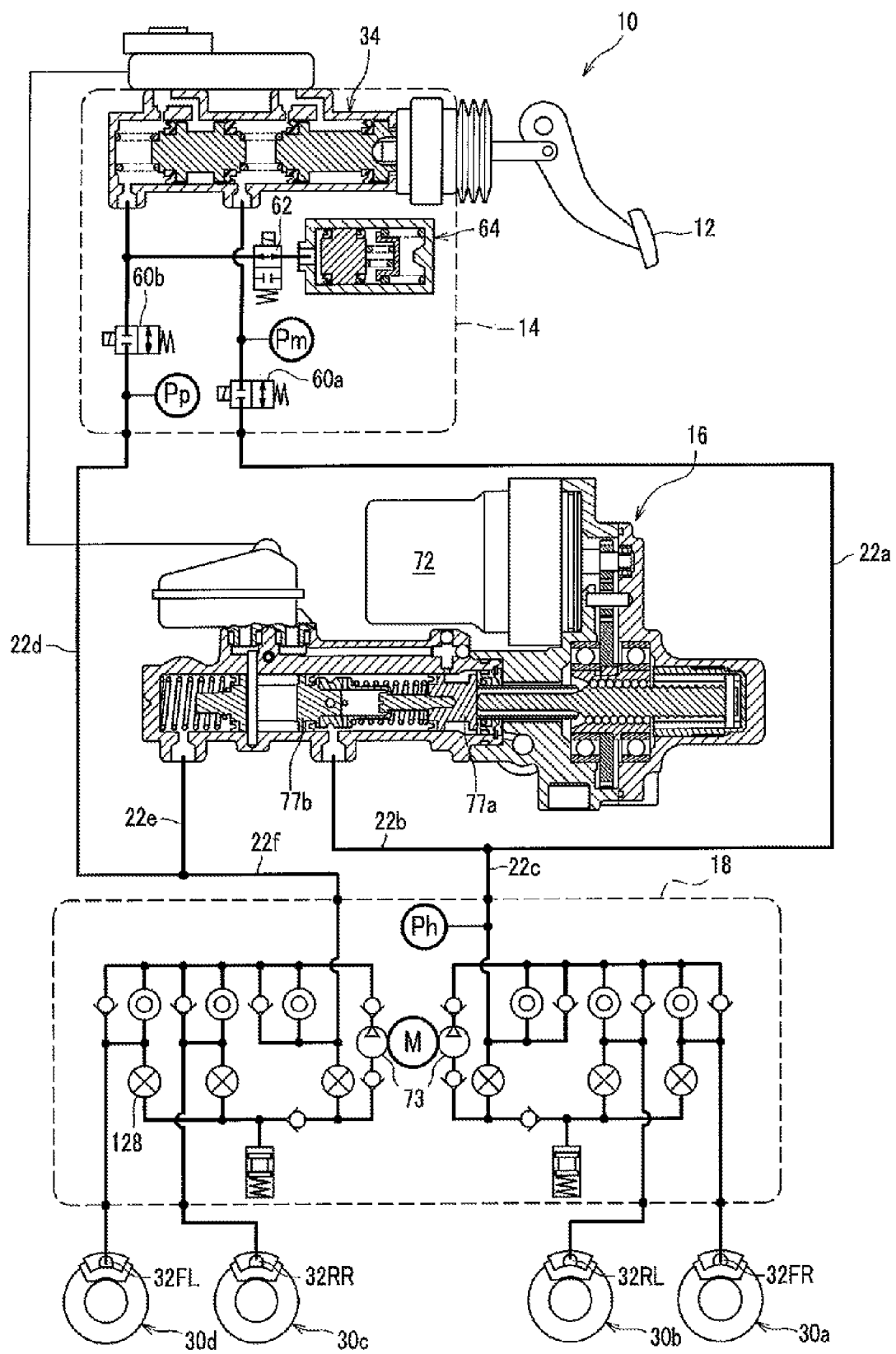
FIG. 2 is a configuration diagram illustrating a schema of the braking force generation device for vehicle according to the embodiment of the present invention.

FIG. 2 is a configuration diagram illustrating a schema of the braking force generation device 10 which constitutes part of the braking force control system 7 according to the embodiment of the present invention.

The braking force generation device 10 includes a master cylinder 34 which transforms pedal pressure given via a brake pedal 12 by a driver into a brake fluid pressure, the motor cylinder device 16 which generates a brake fluid pressure according to the brake fluid pressure generated by the master cylinder 34, or independently of the brake fluid pressure, the aforementioned VSA device 18, and disc brake mechanisms 30a to 30d. The motor cylinder device 16 includes first and second slave pistons 77a, 77b which receive a driving force by an electric motor 72 to generate the brake fluid pressure.

Note that brake fluid pressure sensors Pm, Pp and Ph each for detecting a brake fluid pressure in each portion are arranged in the piping tubes 22a to 22f. Moreover, the VSA device 18 is provided with a pump 73 for pressurizing the brake fluid. Other elements in FIG. 2 are known and have no direct relation to the present invention, and thus explanation thereof is omitted.

[Basic Motion of the Braking Force Generation Device 10]

Next, a description is given of a basic motion of the braking force generation device 10.

In the braking force generation device 10, when the driver steps on the brake pedal 12 while the motor cylinder device 16 and the ECU 80 (see FIG. 3) which performs a by-wire control are in their normal operations, the so-called by-wire brake system becomes active. More specifically, in the braking force generation device 10 in its normal operation, when the driver steps on the brake pedal 12, a first shutoff valve 60a and a second shutoff valve 60b shut off the communication between the master cylinder 34 and the disc brake mechanisms 30a to 30d (wheel cylinders 32FR, 32RL, 32RR, 32FL) for braking each of the wheels, and brake fluid pressure generated by the motor cylinder device 16 is used to actuate the disc brake mechanisms 30a to 30d to thereby brake the wheels.

For this reason, the braking force generation device 10 can be preferably applied to, for example, a vehicle mounting thereon an internal combustion engine having less generation of negative pressure, a vehicle mounting thereon an internal combustion engine having no generation of negative pressure, or a vehicle not mounting thereon an internal combustion engine, such as in an electric vehicle (inclusive of a fuel cell vehicle) or a hybrid vehicle.

Incidentally, in the normal operation, the first shutoff valve 60a and the second shutoff valve 60b are shut off while a third shutoff valve 62 is opened, and thus brake fluid flows from the master cylinder 34 into a stroke simulator 64. Namely, even when the first shutoff valve 60a and the second shutoff valve 60b are shut off, the brake fluid moves to produce a stroke in the brake pedal 12.

On the other hand, in the braking force generation device 10, when the driver steps on the brake pedal 12 while the motor cylinder device 16 and the ECU 80 are in their abnormal operations, the existing hydraulic brake system becomes active. More specifically, in the braking force generation device 10 in its abnormal operation, when the driver steps on the brake pedal 12, the first shutoff valve 60a and the second shutoff valve 60b are brought into an opened state, respectively, and the third shutoff valve 62 is brought into a closed state, and brake fluid pressure generated by the master cylinder 34 is transmitted to the disc brake mechanisms 30a to 30d (wheel cylinders 32FR, 32RL, 32RR, 32FL) to actuate the disc brake mechanisms 30a to 30d (wheel cylinders 32FR, 32RL, 32RR, 32FL) to thereby brake the wheels.

[Peripheral Components of the ECU 80 in the Braking Force Control System 7 According to the Embodiment of the Present Invention]

Figure 3:
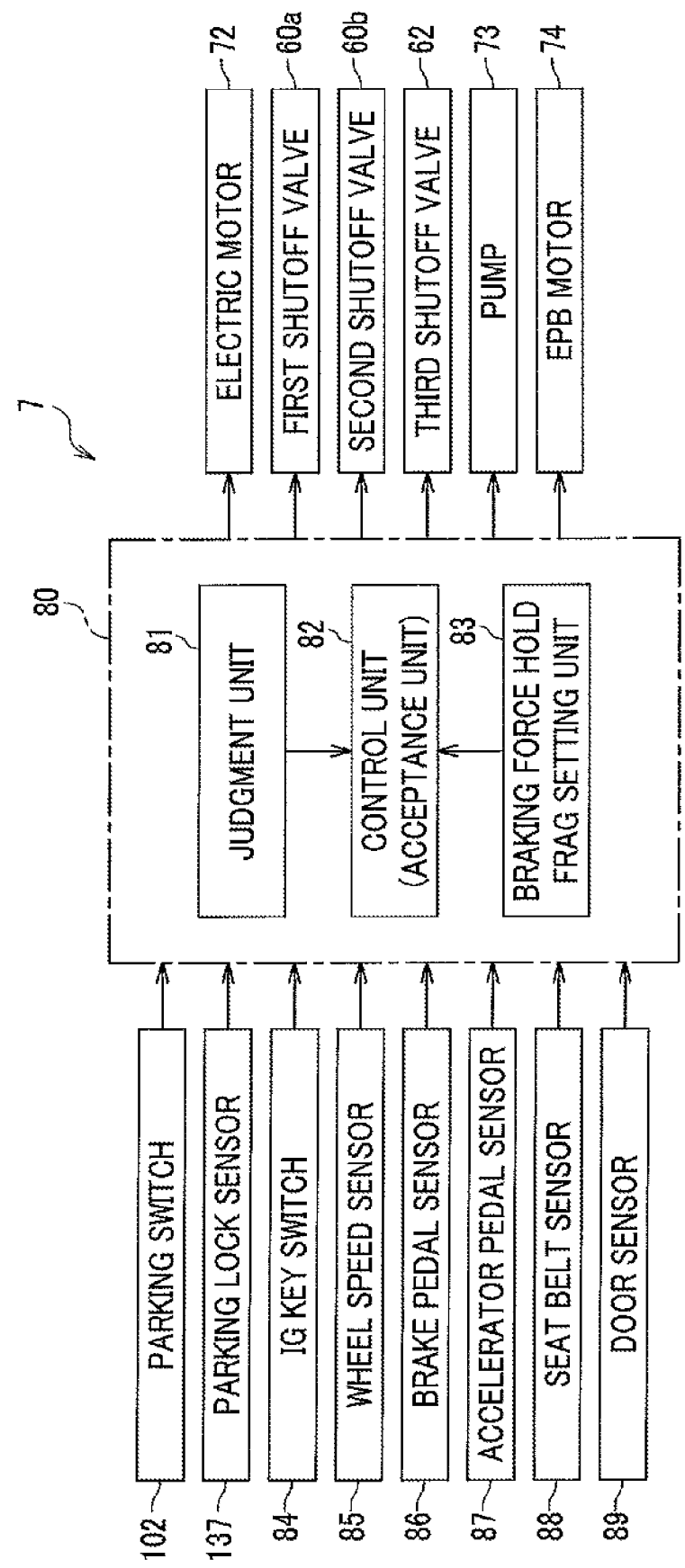
FIG. 3 is a diagram for explaining peripheral components of an ECU in a vehicle control device according to the embodiment of the present invention.

Next, peripheral components of the ECU 80 included in the braking force control system 7 according to the embodiment of the present invention will be described with reference to FIG. 3. FIG. 3 is an explanatory diagram showing peripheral components of the ECU 80 included in the braking force control system 7 according to the embodiment of the present invention.

As illustrated in FIG. 3, an input system is connected to the ECU 80, the input system including a parking switch 102 of a shift device 101 as stated later, a parking lock sensor 137, an ignition key switch (hereinafter abbreviated as "IG key switch") 84, a wheel speed sensor 85, a brake pedal sensor 86, an accelerator pedal sensor 87, a seat belt sensor 88, and a door sensor 89. Moreover, although not illustrated, a switch for setting a braking force hold flag, an electronic parking brake, a yaw rate sensor, a front rear G sensor, a lateral G sensor, a GPS receiving unit, and the like, are connected to the ECU 80.

The IG key switch 84 is a switch which is operated when supplying power from an on-board battery (not shown) to each part of the vehicle V. When the IG key switch 84 is turned on, the power is supplied to the ECU 80 to activate the ECU 80.

The wheel speed sensor 85 has a function of detecting a rotating speed (wheel speed) of each wheel. A signal indicative of the wheel speed of each wheel detected by the wheel speed sensor 85 is sent to the ECU 80.

The brake pedal sensor 86 has a function of detecting depression amount (stroke amount) of the brake pedal 12 by the driver. A signal indicative of the depression amount (stroke amount) of the brake pedal 12 detected by the brake pedal sensor 86 is sent to the ECU 80. Note that the brake pedal sensor 86 may be a brake switch which has a function of merely detecting an ON state (depressed) or an OFF state (not depressed).

The accelerator pedal sensor 87 has a function of detecting depression amount of an accelerator pedal (not shown) by the driver. A signal indicative of the depression amount of the accelerator pedal detected by the accelerator pedal sensor 87 is sent to the ECU 80.

The seat belt sensor 88 detects attachment and detachment of the seat belt to provide the ECU 80 with a detection signal. Moreover, the door sensor 89 detects opening and closing of the door to provide the ECU 80 with a detection signal. Here, all of that "the seat belt is not attached", "the door is opened", "the IG key is pulled" and "the parking switch 102 is depressed" become a factor for generation of "a parking range switching request", i.e., a request for switching a shift range of an automatic transmission 132 to a parking range, regardless of operations by the driver.

On the other hand, as illustrated in FIG. 3, an output system is connected to the ECU 80, the output system including the aforementioned electric motor 72, the first to third shutoff valves 60a, 60b, 62, the pump 73, and EPB (Electronic Parking Brake) motors 74 which are provided for the disc brake mechanisms 30a to 30d, respectively, and which drive a parking mechanism (not shown) that actuate calipers (not shown).

As illustrated in FIG. 3, the ECU 80 includes a judgment unit 81, a braking force hold flag setting unit 83, and a control unit (acceptance unit) 82.

The ECU 80 is constituted by a microcomputer which includes a CPU (Central Processing Unit), a ROM (Read Only Memory), a RAM (Random Access Memory), and the like. The microcomputer reads out programs and data which are stored in the ROM and executes them to thereby perform execution controls of various functions which the ECU 80 has. The various functions include, for example, a function of request for switching to the parking range of the transmission and a brake control function accompanied by the switching motion, Hill Start Assist (HSA) control that holds a braking force to assist hill-start for a predetermined time after the driver releases the brake pedal, Automatic Brake Hold (ABH) control that holds a braking force as it is even after the driver releases the brake pedal, Low Speed Following (LSF) control that generates a braking force regardless of operations by the driver during a low-speed running, a function of performing a step-by-step braking, a function of acquiring behavior information, a function of judging a skid, a function of setting a braking force hold flag, and a function of holding and controlling braking force.

The judgment unit 81 has functions of comparing information which is sent from a behavior information acquisition unit not shown, with a predetermined integrated threshold value, and according to a result of the comparison, making a judgment to break the execution of the braking force hold and control by the control unit 82.

The braking force hold flag setting unit 83 has a function of memorizing a set content associated with on or off of a braking force hold flag for holding a braking force of the vehicle V even after a braking-giving operation by the driver of the vehicle V is removed.

The control unit 82 has a function of executing a braking force hold and control that gives a braking force to the vehicle V according to a braking-giving operation by the driver of the vehicle V and holds the braking force of the vehicle V even after the braking-giving operation is removed. Moreover, the control unit 82 functions to break the execution of the braking force hold and control when the judgment unit 81 makes a judgment to break the execution of the braking force hold and control. On the other hand, the control unit 82 functions to continue the execution of the braking force hold and control as it is when the judgment unit 81 makes a judgment to permit the execution of the braking force hold and control.

[A Shift Operation Device of an Automatic Transmission According to the Embodiment of the Present Invention]

Figure 4:
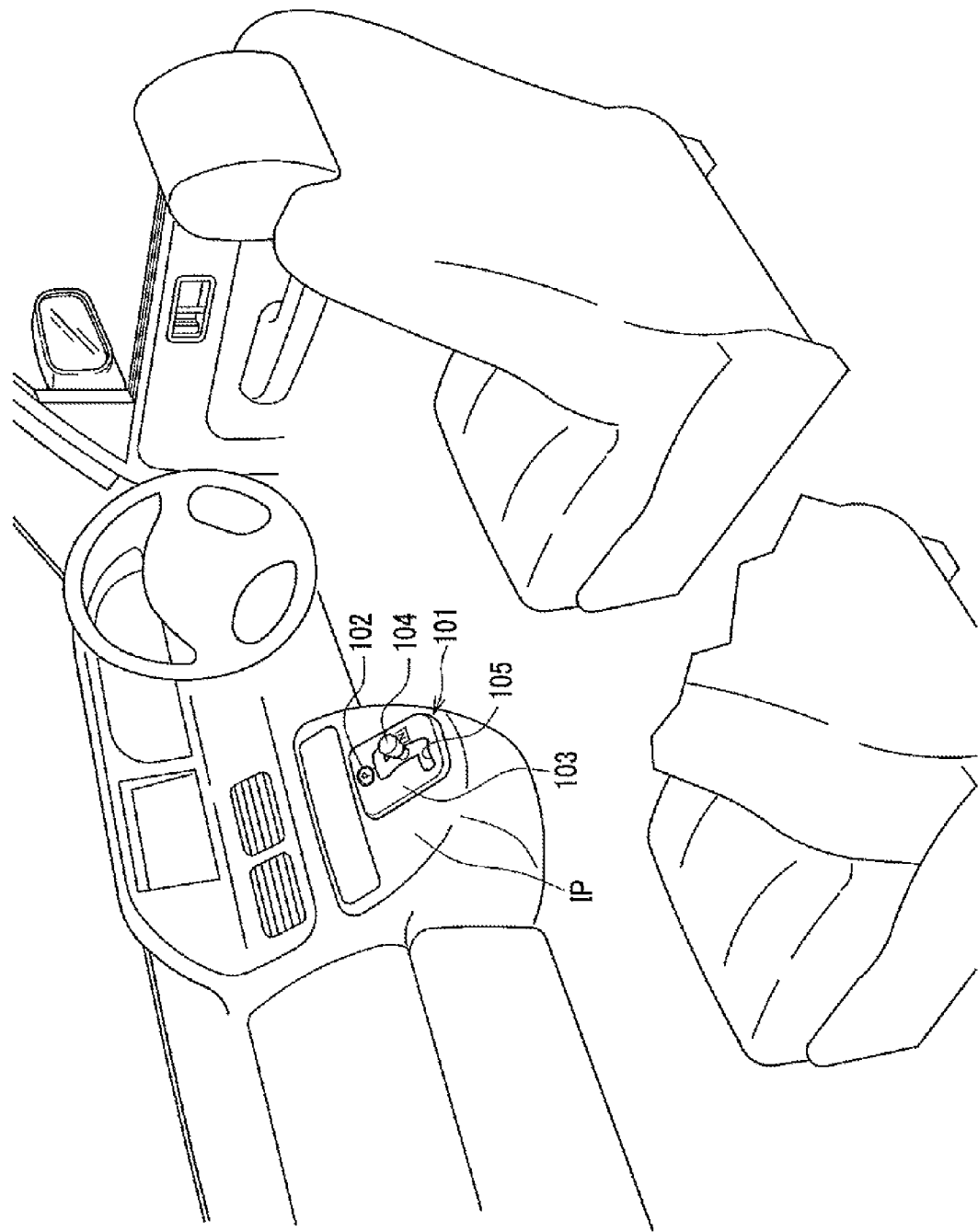
FIG. 4 is a perspective view illustrating an appearance of the circumference of an instrument panel to which a shift device according to the embodiment of the present invention is attached.
Figure 5:
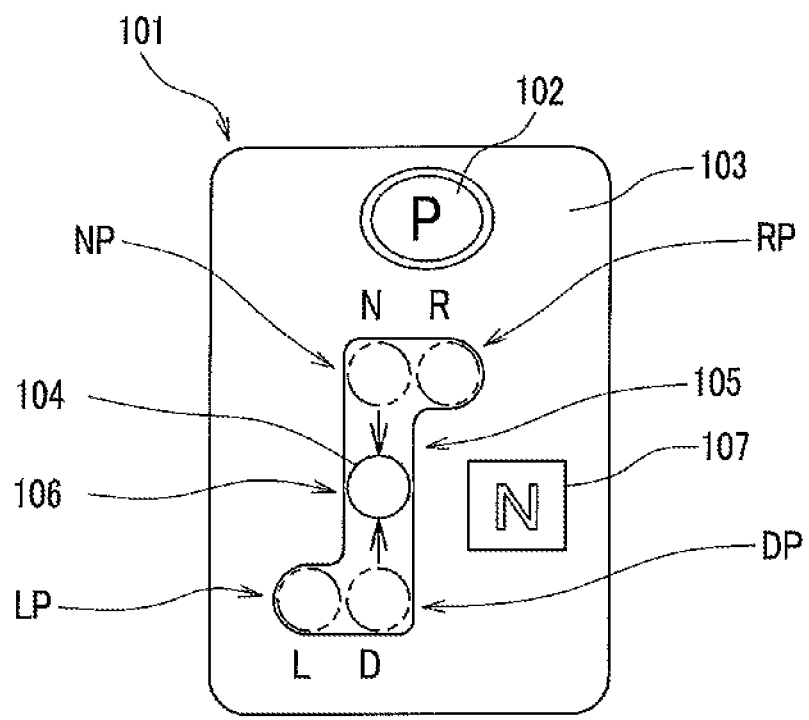
FIG. 5 is a plan view illustrating an example of the shift device according to the embodiment of the present invention.
Figure 6:
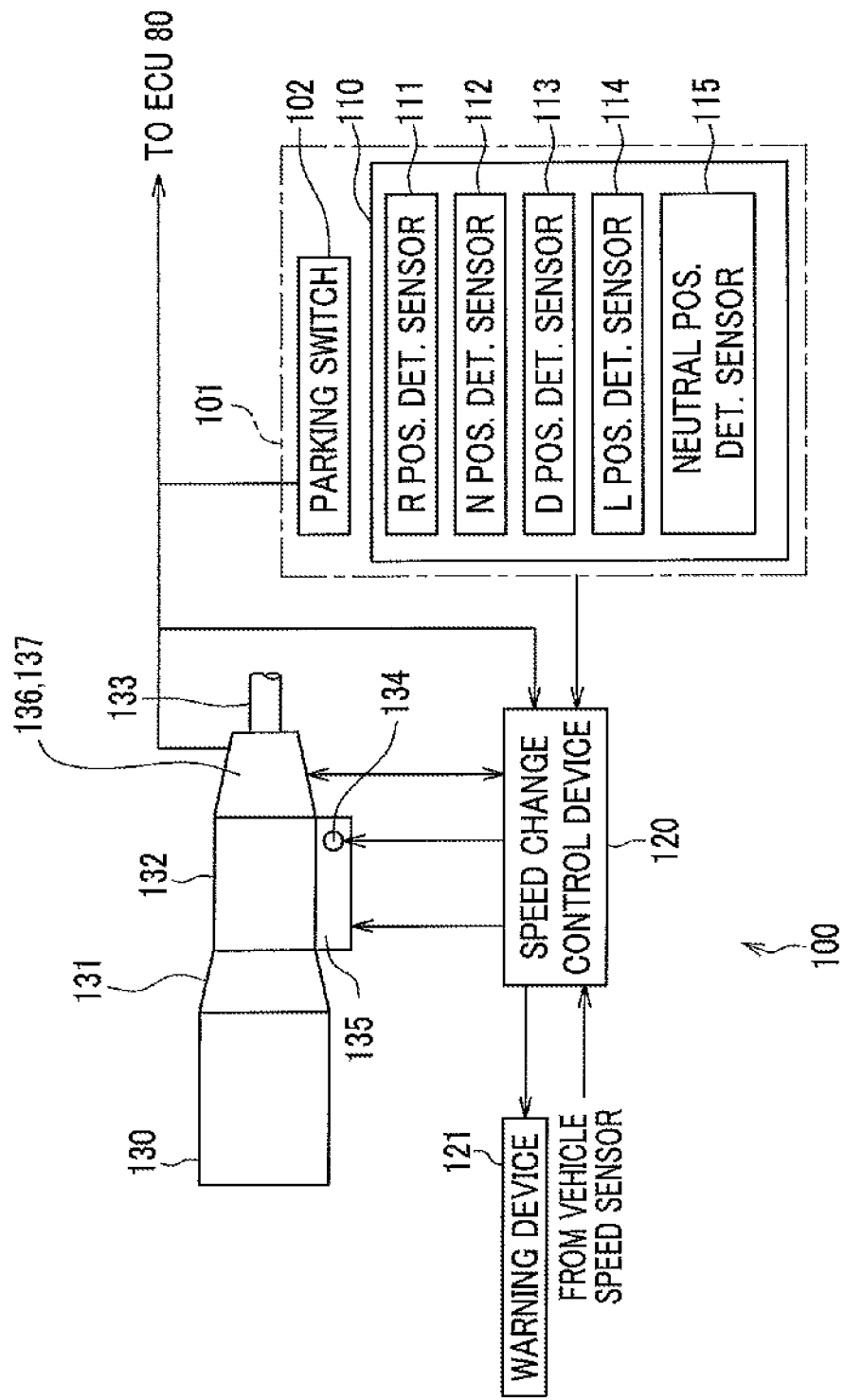
FIG. 6 is a schematic configuration diagram illustrating a shift operation device of an automatic transmission according to the embodiment of the present invention.

FIG. 4 is a perspective view illustrating an appearance of the circumference of an instrument panel to which the shift device according to the present embodiment is attached; FIG. 5 is a plan view for explaining the shift device; and FIG. 6 is a schematic configuration diagram illustrating a shift operation device of an automatic transmission. The shift device 101 according to the embodiment is applied to control of an automatic transmission 132 shown in FIG. 6, and transmits a shift operation signal according to a shift operation on a shift-by-wire basis to a speed change control device 120 (see FIG. 6) which controls a switching of the range of the automatic transmission 132.

The shift device 101 is installed, as shown in FIG. 4, for example, in an instrument panel IP between the driver's seat and the passenger seat in the vehicle. Although the present embodiment is considered as the mode that installs in the instrument panel IP an escutcheon cover 103 in which a gate trench 105 is formed, it can also be considered as the mode that forms the gate trench 105 in the instrument panel IP itself.

Note, the installation position of the shift device 101 is not limited to the instrument panel IP, and the shift device 101 can be installed in various locations, such as installing in a steering column not shown.

Moreover, provided on the upper part of the escutcheon cover 103 is a parking switch 102 of push-button type which is depressed when switching the range of the automatic transmission 132 to a parking range. Namely, when a driver depresses the parking switch 102, the range of the automatic transmission 132 is switched to the parking range.

As illustrated in FIG. 5, a shift lever 104 which attaches a shift knob to the upper end thereof is inserted into the gate trench 105. Moreover, signs of "R", "N", "D" and "L" indicating a reverse range, a neutral range, a drive range and a low range, respectively, which are set in the automatic transmission 132, are given to the side of the gate trench 105 of the escutcheon cover 103. Note that these signs can also be given to the head of the shift knob. The pattern of a shift position is a neutral position NP corresponding to the neutral range, a drive position DP corresponding to the drive range, a reverse position RP corresponding to the reverse range, or a low position LP corresponding to the low range. The central part of the gate trench 105 serves as a neutral position 106 of the shift lever 104.

When the shift position is divided according to the mode of movement of the shift lever 104, it includes a momentary position from which the shift lever 104 returns automatically to the neutral position 106 through urging force by a spring not shown or the like when the hand is released, and a holding position at which the shift lever 104 is held as it is by a locking mechanism not shown or the like even if the hand is released. Note that attached to the escutcheon cover 103 is a display part 107 which shows the sign indicating a current range in the form of a light-emitting display. This display part 107 may be formed on the instrument panel IP (see FIG. 4) near the shift device 101, or in a meter panel not shown, without being limited to the formation on the escutcheon cover 103.

Moreover, when the shift lever 104 is moved to any one shift position of the neutral position, the drive position, the reverse position or the low position, the shift device 101 of the present embodiment can output a shift operation signal according to the shift position with a position sensor not shown, and thus functions as the shift device 101 of a shift-by-wire system.

Next, as illustrated in FIG. 6, connected to the automatic transmission 132 is a shift-by-wire device 100 which is provided with a speed change control device 120 and a shift device 101. The automatic transmission 132 has an input side which is coupled via a torque converter 131 to an engine output shaft not shown of an engine 130, and an output side coupled to an output shaft 133 which transmits power to driving wheels not shown. This automatic transmission 132 is provided with a hydraulic control unit 134 with which an electric actuator 135 for performing the range switching of the automatic transmission 132 is provided.

The hydraulic control unit 134 and the electric actuator 135 are driven and controlled based on control signals from the speed change control device 120. Moreover, the automatic transmission 132 includes a parking lock mechanism 136 for mechanically locking the output shaft 133 of the automatic transmission 132 after the automatic transmission 132 is set to a neutral state in which a power transmission between the engine 130 side and the output shaft 133 side is broken in the parking range, and a parking lock sensor 137 which detects that the parking lock mechanism 136 is actuated.

The speed change control device 120 is electrically connected to the shift device 101, and from an operation position detecting sensor 110, a shift operation signal according to the shift operation condition of the shift device 101 is inputted to the speed change control device 120. The speed change control device 120 outputs control signals to the hydraulic control unit 134 and the electric actuator 135 to drive and control the both, based on the shift operation signal inputted from the shift device 101, or based on a control signal from the ECU 80.

Moreover, connected to the speed change control device 120 is a warning device 121 which activates an alarm based on a control signal from the speed change control device 120, for example, emits a beep sound to draw the driver's attention. Furthermore, connected to the speed change control device 120 is a vehicle speed sensor not shown which outputs a vehicle speed signal according to a measured speed of the "v vehicle.

Moreover, as illustrated in FIG. 5, the shift device 101 has as its shift position, the reverse position RP, the neutral position NP, the drive position DP, the low position LP and the neutral position 106. For each shift position, as illustrated in FIG. 6, the operation position detecting sensor 110 includes a reverse (R) position detecting sensor 111, a neutral (N) position detecting sensor 112, a drive (D) position detecting sensor 113, a low (L) position detecting sensor 114 and a neutral position detecting sensor 115, respectively. The shift device 101 outputs the shift operation signal according to the shift operation condition. Moreover, the shift device 101 also outputs a detection signal responding to operation of the parking switch 102.

Note that in the neutral range, the automatic transmission 132 is set to a neutral state in which a power transmission between the engine 130 side and the output shaft 133 side is broken, and in the parking range, the automatic transmission 132 is set to a neutral state in which a power transmission between the engine 130 side and the output shaft 133 side is broken, and the parking lock mechanism 136 is actuated to mechanically lock the output shaft 133 of the automatic transmission 132.

[Brake Control Based on Parking Range Switching Request According to the Embodiment of the Present Invention]

Figure 7:
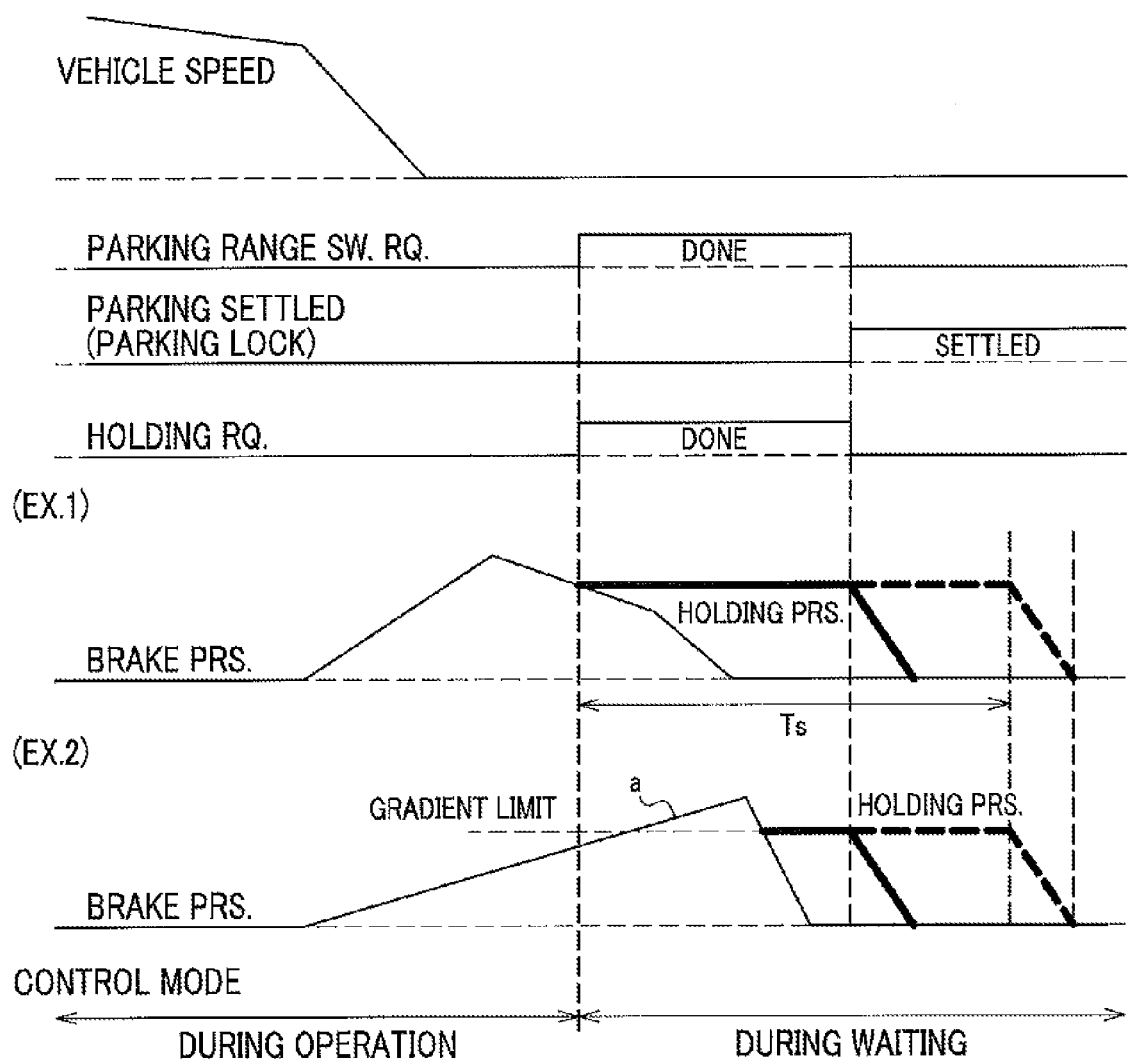
FIG. 7 is a chart representing an example of the relationship between a parking range switching request and a brake control by the vehicle control device.

Next, a brake control based on a parking range switching request will be described below in detail with reference to FIGS. 7 to 11. FIG. 7 is a chart representing the relationship between the parking range switching request and the brake control.

(Basic Form: FIG. 7)

As illustrated in FIG. 7, when the vehicle is brought from its running state with a vehicle speed as illustrated into a stopped state, the control unit 82 (the acceptance unit in the claims) of the ECU 80 in the braking force control system 7 recognizes that "the parking switch is depressed" based on an operation signal from the parking switch 102 (parking range changeover switch), or that "the IG key is pulled" based on a detection signal from the IG key switch 84, or that "the seat belt is not attached" based on a detection signal from the seat belt sensor 88, or that "the door is opened" based on a detection signal from the door sensor 89, and thus accepts the recognized content as a "parking range switching request".

Then, the ECU 80 judges a current running speed provided from the vehicle speed sensor and the other current status, turns a parking flag on if the parking range switching is possible, and supplies a parking range switching request signal to the speed change control device 120 to perform the parking range switching of the automatic transmission 132. In response to the parking range switching request signal, the speed change control device 120 supplies control signals to the hydraulic control unit 134, the electric actuator 135 and the parking lock mechanism 136 to have the automatic transmission 132 perform the parking range switching operation. Note that a response time is required for the switching to the parking range. Accordingly, this response time may possibly give a feeling of strangeness to a driver who thinks that the output shaft is locked to be switched to the parking range concurrently with depression of the parking switch 102.

First Example (EX. 1)

Case of the Brake Pedal being Released

The first example in FIG. 7 represents the case where the driver steps on the brake pedal during running of the vehicle to stop the vehicle, then releases the brake pedal without increasingly stepping on it, and depresses the parking switch 102 in the process of releasing to thereby make a "parking range switching request" done. The chart shows a brake pressure (thin line) based on the operation of the brake pedal by the driver, and a holding pressure (thick line) of the brake which is triggered by the "holding request" according to the "parking range switching request".

In this case, i.e., "when the driver immediately releases the brake pedal" as shown in FIG. 7, the control unit 82 of the ECU 80 supplies a control signal to the electric motor 72 of the motor cylinder device 16 at a timing of making the "holding request" done which is the same timing as the "parking range switching request" (transmission of the parking range switching request signal to the automatic transmission 132).

In response to this, the electric motor 72 of the motor cylinder device 16 actuates the disc brake mechanisms 30a to 30d to brake the wheels, using brake fluid pressure generated. Next, when the control unit 82 of the ECU 80 receives from the parking lock sensor 137 a detection signal indicating that the parking lock mechanism 136 has locked the output shaft 133 of the automatic transmission 132, it stops supplying the control signal to the electric motor 72 of the motor cylinder device 16 to finish the braking of the wheels by the disc brake mechanisms 30a to 30d. By this operation, it is possible to prevent the vehicle from setting into motion in the response time until the parking range of the automatic transmission is locked, on a hill or the like.

Note that when the ECU 80 does not receive from the parking lock sensor 137 a detection signal indicating the parking lock and a predetermined time has elapsed, as shown by thick broken lines in EX. 1 of FIG. 7 and EX. 2 stated later, and as indicated by Is in FIG. 7, the ECU 80 finishes the braking in the predetermined time even if the holding request falls and settlement of the parking cannot be detected. Namely, even if the ECU 80 does not receive the detection signal, it stops supplying the control signal to the electric motor 72 of the motor cylinder device 16 to finish the braking of the wheels by the disc brake mechanisms 30a to 30d. By this operation, the driver can become aware of a possible failure in the parking range switching function of the shift-by-wire device 100 because of the vehicle setting into motion. Note that the above predetermined time is appropriately set based on experiments and simulations.

Second Example (EX. 2)

Case of the Brake Pedal being Increasingly Stepped on

The second example in FIG. 7 represents the case where the driver steps on the brake pedal during running of the vehicle to stop the vehicle, then increasingly steps on the brake pedal because of being on a hill ("a" in FIG. 7), and depresses the parking switch 102 to make the "parking range switching request" done. The chart shows a brake pressure (thin line) based on the operation of the brake pedal by the driver, and a holding pressure (thick line) of the brake which is triggered by the "holding request" according to the "parking range switching request".

"When the brake pedal is increasingly stepped on" as shown in FIG. 7, the control unit 82 of the ECU 80 does not perform a braking based on the "holding request" while the original holding pressure by the brake pedal is left ("a" in EX. 2 of FIG. 7). Thereafter, the control unit 82 of the ECU 80 starts a braking based on the "holding request" when the holding pressure by the brake pedal becomes lower than a brake pressure at a gradient limit.

More specifically, as shown in (EX. 2) of FIG. 7, the control unit 82 supplies the control signal to the electric motor 72 of the motor cylinder device 16 at a timing at which the holding pressure by the brake pedal is lowered to a pressure at the gradient limit, and in turn the electric motor of the motor cylinder device 16 actuates the disc brake mechanisms 30*a* to 30*d*, using brake fluid pressure generated, and increases the braking force to brake the wheels.

Thereafter, when the control unit 82 of the ECU 80 detects from the parking lock sensor 137 that the parking lock mechanism 136 has locked the output shaft 133 of the automatic transmission 132 ("parking settled" in FIG. 7), it stops supplying the control signal to the electric motor 72 of the motor cylinder device 16 to finish the braking of the wheels by the disc brake mechanisms 30*a* to 30*d*. By this operation, it is possible to prevent the vehicle from setting into motion until the parking range of the automatic transmission is locked, in coordination with the normal braking by the brake pedal.

Figure 8:
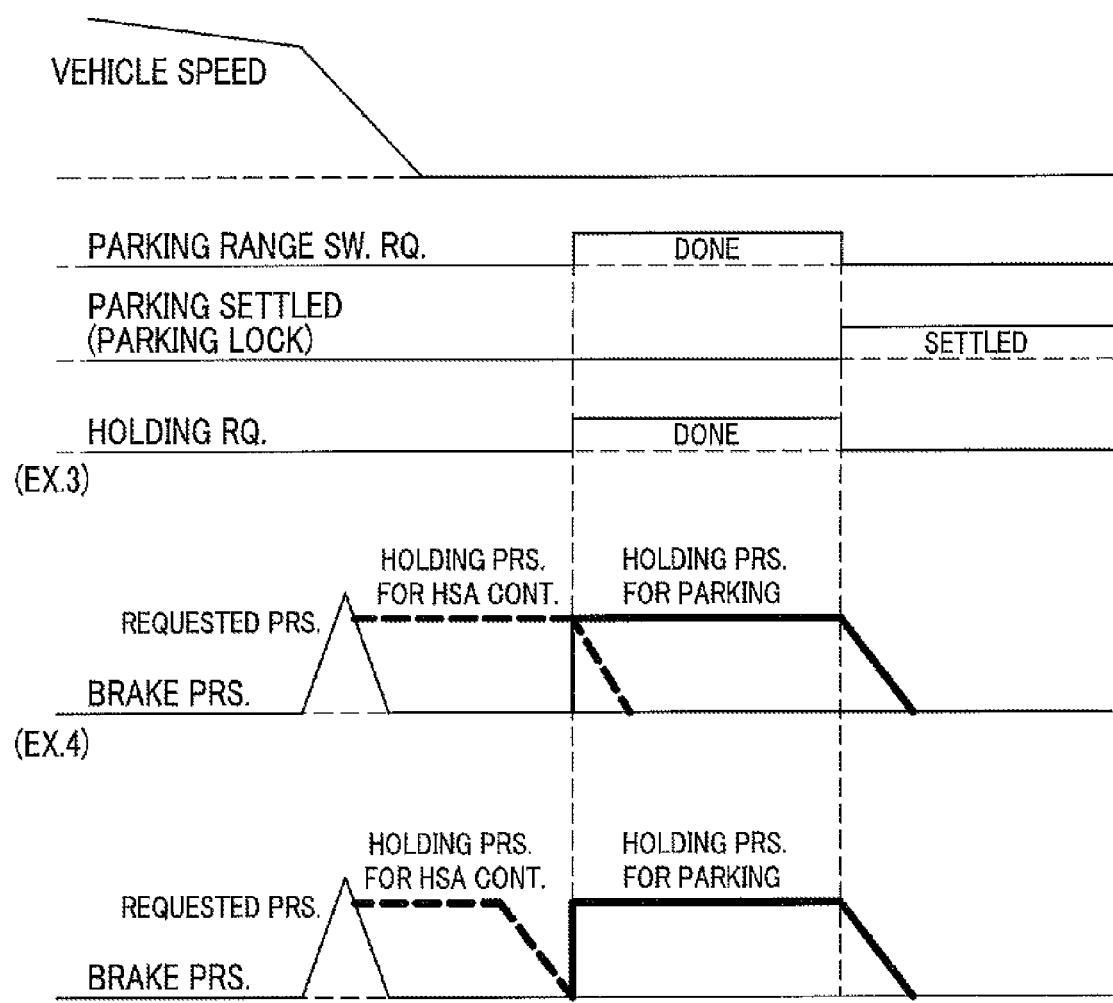
FIG. 8 is a chart representing the relationship between a parking range switching request during operation of Hill Start Assist control and a brake control by the vehicle control device.

Note that in EX. 1 and EX. 2, in the case of the brake pedal being not fully stepped on or the brake pressure being low when the "holding request" is done, the control unit 82 of the ECU 80 may supply a control signal to the electric motor 72 of the motor cylinder device 16 to increase the braking force. (Parking Range Switching Request During Operation/after Operation of Hill Start Assist Control: FIG. 8)

As described above, and as shown by a thick broken line in FIG. 8, ˝v the Hill Start Assist control is a function that can hold a braking force for a short time to surely perform a start on the hill after the brake pedal is released. As one example of the Hill Start Assist control, the control unit 82 of the ECU 80 in the braking force control system 7 supplies the control signal to the electric motor 72 of the motor cylinder device 16, and in turn the electric motor 72 of the motor cylinder device 16 actuates the disc brake mechanisms 30*a* to 30*d*, using brake fluid pressure generated, and brakes the wheels. However, the Hill Start Assist control may be realized by that the control unit 82 of the ECU 80 in the braking force control system 7 supplies a control signal to the pump 73 of the VSA device 18 to operate the VSA device 18.

As illustrated in FIG. 8, when the "parking range switching request" is done during operation of the Hill Start Assist control, the control unit 82 (the acceptance unit in the claims) of the ECU 80 in the braking force control system 7 recognizes that "the parking switch is depressed" based on an operation signal from the parking switch 102, or that "the IG key is pulled" based on a detection signal from the IG key switch 84, or that "the seat belt is not attached" based on a detection signal from the seat belt sensor 88, or that "the door is opened" based on a detection signal from the door sensor 89, and thus accepts the recognized content as a parking range switching request. Then, in the same way as in the case of FIG. 7, the ECU 80 supplies a parking range switching request signal to the speed change control device 120 to perform the parking range switching operation of the automatic transmission 132.

Third Example (EX. 3)

Case of the Parking Range Switching Request being Done During Operation of Hill Start Assist Control In the third example in FIG. 8, when the driver steps on the brake pedal during running of the vehicle to stop the vehicle and then the vehicle is on a hill with a predetermined gradient or more, the Hill Start Assist control operates to hold the brake pressure as shown by a thick broken line even if the driver releases the brake pedal. During the operation of the Hill Start Assist control, the driver depresses the parking switch 102 to make the "parking range switching request" done.

The chart shows a driver's requested pressure (thin line) which is a brake pressure based on the operation of the brake pedal by the driver, a holding pressure (thick broken line) for Hill Start Assist control, and a holding pressure (thick line) for parking which is a holding pressure of the brake which is triggered by the "holding request" according to the "parking range switching request".

"When the parking range switching request is done during the operation of the Hill Start Assist control" as shown in FIG. 8, the control unit 82 of the ECU 80 keeps the holding pressure (shown by a thick broken line) for HSA by the Hill Start Assist control, gradually reduces the holding pressure for HSA by the Hill Start Assist control as shown by the thick broken line, at a timing of generation of the "parking range switching request" (transmission of the parking range switching request signal to the automatic transmission 132), and switches to the braking shown by the thick broken line, based on the "parking range switching request". Namely, the control unit 82 of the ECU 80 supplies the control signal to the electric motor of the motor cylinder device 16 at the timing of the "parking range switching request", and in turn the electric motor 72 of the motor cylinder device 16 actuates the disc brake mechanisms 30*a* to 30*d*, using brake fluid pressure generated, and brakes the wheels.

Next, when the control unit 82 of the ECU 80 detects from the parking lock sensor 137 that the parking lock mechanism 136 has locked the output shaft 133 of the automatic transmission 132, it stops supplying the control signal to the electric motor 72 of the motor cylinder device 16 to finish the braking of the wheels by the disc brake mechanisms 30*a* to 30*d*. By this operation, it is possible to prevent the vehicle from setting into motion until the parking range of the automatic transmission is locked, even during the operation of the Hill Start Assist control.

Fourth Example (EX. 4)

Case of the Parking Range Switching Request being Done after Operation of Hill Start Assist Control The fourth example in FIG. 8 represents the case where the driver steps on the brake pedal during running of the vehicle to stop the vehicle, then the Hill Start Assist control operates because of being on a hill, and after the Hill Start Assist control finishes, the driver depresses the parking switch 102 to make the "parking range switching request" done.

The chart shows a driver's requested pressure (thin line) which is a brake pressure based on the operation of the brake pedal by the driver, a holding pressure (thick broken line) for Hill Start Assist control, and a holding pressure (thick line) for parking which is a holding pressure of the brake which is triggered by the "holding request" according to the "parking range switching request".

"When the parking range switching request is done after the operation of the Hill Start Assist control", the control unit 82 of the ECU 80 appropriately reduces to zero the holding pressure (shown by a thick broken line) for HSA by the Hill Start Assist control as shown in FIG. 8 (EX. 4), and then switches to the braking based on the "parking range switching request" at a timing of generation of the "parking range switching request".

More specifically, the control unit 82 of the ECU 80 supplies the control signal to the electric motor 72 of the motor cylinder device 16 at the timing of the "parking range switching request", and in turn the electric motor 72 of the motor cylinder device 16 actuates the disc brake mechanisms 30*a* to 30*d*, using brake fluid pressure generated, and brakes the wheels. The operation to finish the braking of the wheels in response to the detection signal from the parking lock sensor 137 is also the same as that in the case of EX. 3. By this operation, it is possible to prevent the vehicle from setting into motion until the parking range of the automatic transmission is locked, even after the operation of the Hill Start Assist control.

Figure 9:
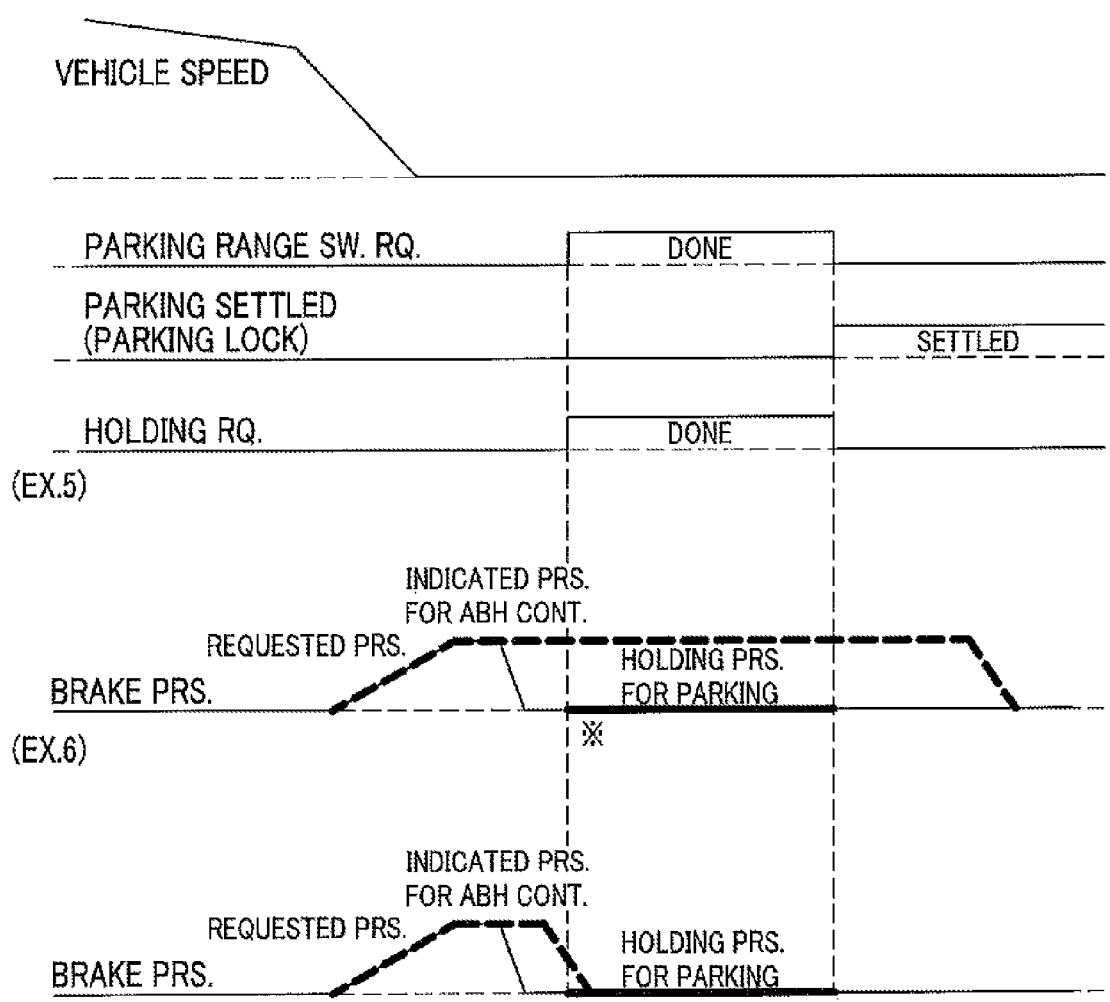
FIG. 9 is a chart representing the relationship between a parking range switching request during operation of Automatic Brake Hold control and a brake control by the vehicle control device.

(Parking Range Switching Request During Operation of Automatic Brake Hold Control: FIG. 9)

The Automatic Brake Hold control is a function that can hold a braking force for a longer time than in the Hill Start Assist control after the brake pedal is released. As one example of the Automatic Brake Hold control, the control unit 82 of the ECU 80 in the braking force control system 7 supplies the control signal to the electric motor 72 of the motor cylinder device 16, and in turn the electric motor 72 of the motor cylinder device 16 actuates the disc brake mechanisms 30a to 30d, using brake fluid pressure generated, and brakes the wheels. However, the Automatic Brake Hold control may be realized by that the control unit 82 of the ECU 80 in the braking force control system 7 supplies a control signal to the pump 73 of the VSA device 18 to operate the VSA device 18.

As illustrated in FIG. 9, when the "parking range switching request" is done during operation of the Automatic Brake Hold control, the control unit 82 (the acceptance unit in the claims) of the ECU 80 in the braking force control system 7 accepts the "parking range switching request" as a parking range switching request. Then, in the same way as in the cases of FIG. 7 and FIG. 8, the ECU 80 supplies a parking range switching request signal to the speed change control device 120 to perform the parking range switching operation of the automatic transmission 132.

Fifth Example (EX. 5)

Case of the Parking Range Switching Request being Done During Operation of Automatic Brake Hold Control The fifth example in FIG. 9 represents the case where the driver steps on the brake pedal during running of the vehicle to stop the vehicle, then the Automatic Brake Hold control operates to keep indicated pressure for ABH control even after the driver releases the brake pedal, and during the operation of the Automatic Brake Hold control, the driver depresses the parking switch 102 to make the "parking range switching request" done.

The chart shows a driver's requested pressure (thin line) which is a brake pressure based on the operation of the brake pedal by the driver, a holding pressure (thick broken line) for Automatic Brake Hold control, and a holding pressure (the value is zero) (thick line) for parking which is a holding pressure of the brake which is triggered by the "holding request" according to the "parking range switching request".

"When the parking range switching request is done during the operation of the Automatic Brake Hold control", the control unit 82 of the ECU 80 keeps on holding an indicated pressure for ABH control as shown in FIG. 9 (EX. 5). In this case, no braking according to the "parking range switching request" is performed. Moreover, the control unit 82 of the ECU 80 keeps on holding the indicated pressure for ABH control in response to the detection signal from the parking lock sensor 137 even after the "parking range switching request" is finished, but after the elapse of a predetermined time, the holding pressure (thick broken line) for ABH control ceases to exist.

Namely, the control unit 82 of the ECU 80 holds the braking for the predetermined time, as the Automatic Brake Hold control, even if the parking range switching of the speed change control device is finished (parking settled) until the driver steps on the brake pedal or the accelerator pedal, i.e., until the conditions for deactivating the Automatic Brake Hold control are met (see the portion marked by in FIG. 9). Moreover, the EPB (Electronic Parking Brake) is operated by unfastening the seat belt, or by pulling the ignition key. Thus, during the operation of the Automatic Brake Hold control, priority is placed on the request for the Automatic Brake Hold control even if the "parking range switching request" is generated, and accordingly it is possible to surely perform the Automatic Brake Hold control.

Sixth Example (EX. 6)

Case of the Parking Range Switching Request being Done after Deactivation of Automatic Brake Hold Control The sixth example in FIG. 9 represents the case where the driver steps on the brake pedal during running of the vehicle to stop the vehicle, then the Automatic Brake Hold control operates to keep indicated pressure for ABH control even after the driver releases the brake pedal, thereafter the Automatic Brake Hold control is deactivated because the driver has done operations such as stepping on the brake pedal, and the driver depresses the parking switch 102 while stepping on the brake pedal, to make the "parking range switching request" done.

Here, as is also the case where the driver depresses the parking switch 102 while stepping on the accelerator pedal, the indicated pressure for the Automatic Brake Hold control is reduced because there is the driver's will for operation and deactivation.

The chart shows a driver's requested pressure (thin line) which is a brake pressure based on the operation of the brake pedal by the driver, a holding pressure (thick broken line) for Automatic Brake Hold control, and a holding pressure (the value is zero) (thick line) for parking which is a holding pressure of the brake which is triggered by the "holding request" according to the "parking range switching request".

"When the parking range switching request is done upon deactivation of the Automatic Brake Hold control", the control unit 82 of the ECU 80 reduces the holding pressure for ABH control based on the Automatic Brake Hold control when the Automatic Brake Hold control is deactivated, as shown in FIG. 9 (EX. 6). Even if the "parking range switching request" is generated while the holding pressure is reduced, no braking based on the "parking range switching request" is performed. This is because the driver has operated the accelerator pedal, the brake pedal or the like to deactivate the Automatic Brake Hold control based on the driver's will for start, i.e., the deactivation is one after the conditions for deactivating the Automatic Brake Hold control have been met, and thus it is considered not necessary to brake the wheels. This enables a driving motion according to the driver's will for operation even if the "parking range switching request" is generated.

Figure 10:
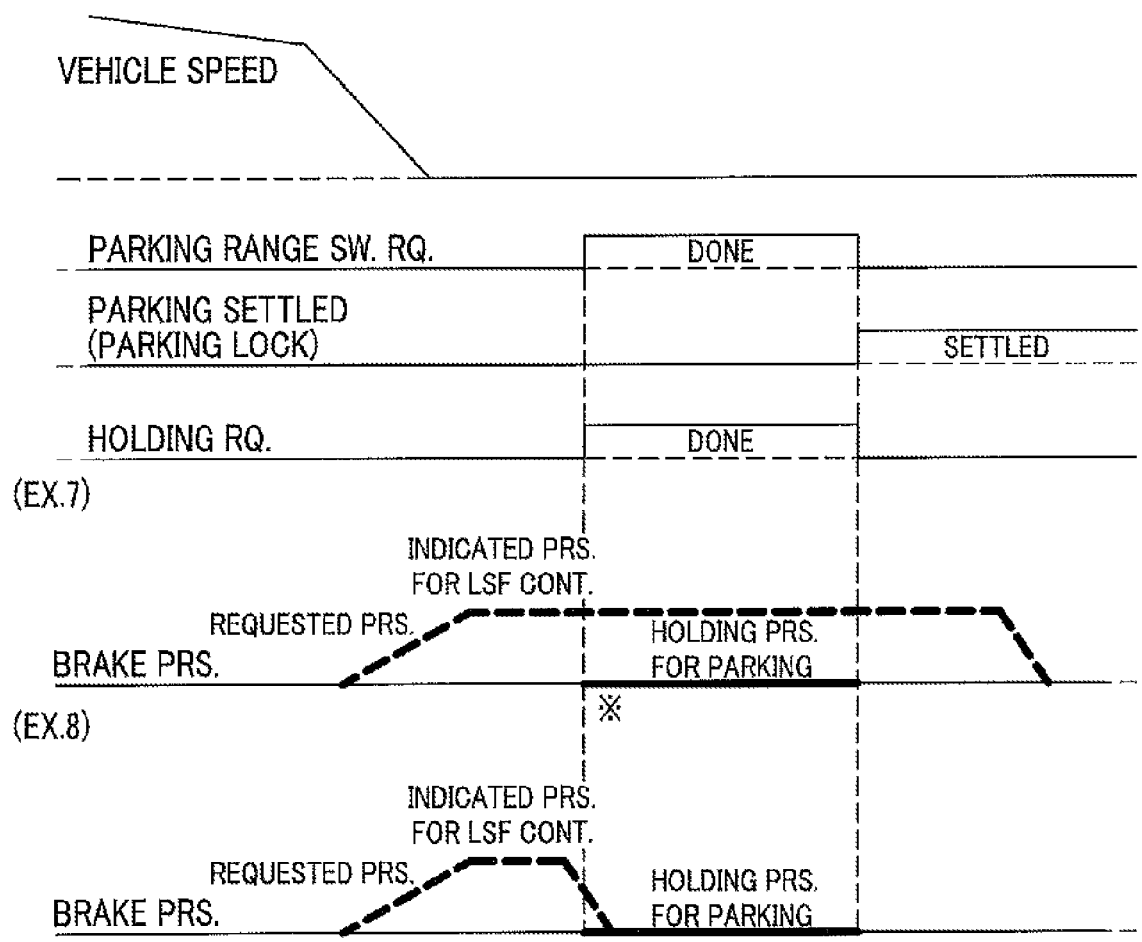
FIG. 10 is a chart representing the relationship between a parking range switching request during operation of Low Speed Following control and a brake control by the vehicle control device.

(Parking Range Switching Request During Operation of Low Speed Following Control: FIG. 10)

The Low Speed Following control is a function that performs an automatic driving to follow a preceding vehicle at a low vehicle speed and automatically gives a braking according to the behavior of the preceding vehicle without a braking operation by the driver. As one example of the Low Speed Following control, the control unit 82 of the ECU 80 in the braking force control system 7 supplies the control signal to the electric motor 72 of the motor cylinder device 16, and in turn the electric motor 72 of the motor cylinder device 16 actuates the disc brake mechanisms 30a to 30d, using brake fluid pressure generated, and brakes the wheels. However, the Low Speed Following control may be realized by that the control unit 82 of the ECU 80 in the braking force control system 7 supplies a control signal to the pump 73 of the VSA device 18 to operate the VSA device 18.

As illustrated in FIG. 10, when the "parking range switching request" is done during operation of the Low Speed Following control, the control unit 82 (the acceptance unit in the claims) of the ECU 80 in the braking force control system 7 accepts the "parking range switching request" as a parking range switching request. Then, in the same way as in the cases of FIG. 7, FIG. 8 and FIG. 9, the ECU 80 supplies a parking range switching request signal to the speed change control device 120 to perform the parking range switching operation of the automatic transmission 132.

Seventh Example (EX. 7)

Case of the Parking Range Switching Request being Done During Operation of Low Speed Following Control The seventh example in FIG. 10 shows a state of the vehicle being running by the Low Speed Following control without needing the driver's operation. For this reason, the driver's requested pressure (thin line) is zero. In this example, during running of the vehicle by the Low Speed Following control, the vehicle stops based on the indicated pressure for LSF control without the driver's stepping on the brake pedal, for example, because a preceding vehicle has stopped. The seventh example represents the case where the driver depresses the parking switch 102 during stop of the vehicle to make the "parking range switching request" done, thereafter the output shaft is locked and the "parking range switching request" is made off, and then, for example, because the driver's operation has been done, the indicated pressure for LSF control ceases to exist.

The chart shows a driver's requested pressure (the value is zero) (thin line) which is a brake pressure based on the operation of the brake pedal by the driver, a holding pressure (thick broken line) for Low Speed Following control, and a holding pressure (the value is zero) (thick line) of the brake which is triggered by the "holding request" according to the "parking range switching request".

"When the parking range switching request is done during the operation of the Low Speed Following control", the control unit 82 of the ECU 80 keeps on holding an indicated pressure for LSF control as shown in FIG. 10 (EX. 7). In this case, no braking according to the "parking range switching request" is performed. Moreover, the control unit 82 of the ECU 80 keeps on holding the indicated pressure for LSF control in response to the detection signal from the parking lock sensor 137 even after the "parking range switching request" is finished. The control unit 82 of the ECU 80 keeps the indicated pressure for LSF control until some operations by the driver are done (see the portion marked by in FIG. 10). Thus, during the operation of the Low Speed Following control, priority is placed on the Low Speed Following control even if the "parking range switching request" is generated, and accordingly it is possible to surely perform the Low Speed Following control.

Eighth Example (EX. 8)

Case of the Parking Range Switching Request being Done During Deactivation of Low Speed Following Control The eighth example in FIG. 10 shows a state of the vehicle being running by the Low Speed Following control. For this reason, the driver's requested pressure (thin line) is zero. In this case, the vehicle stops based on the indicated pressure for LSF control without the driver's stepping on the brake pedal, for example, because a preceding vehicle has stopped. This example represents the case where thereafter, for example, because the driver has stepped on the brake pedal, the Low Speed Following control is deactivated and when the indicated pressure for LSF control is being reduced, the driver depresses the parking switch 102 while stepping on the brake pedal, to make the "parking range switching request" done, and then the indicated pressure for LSF control is reduced to zero.

Here, as is also the case where the driver depresses the parking switch 102 while stepping on the accelerator pedal, the indicated pressure for the Low Speed Following control is reduced because there is the driver's will for operation and deactivation.

The chart shows a driver's requested pressure (the value is zero) (thin line) which is a brake pressure based on the operation of the brake pedal by the driver, a holding pressure (thick broken line) for Low Speed Following control, and a holding pressure (the value is zero) (thick line) for parking which is a holding pressure of the brake which is triggered by the "holding request" according to the "parking range switching request".

"When the parking range switching request is done after deactivation of the Low Speed Following control", the control unit 82 of the ECU 80 makes zero the holding pressure for LSF control after the Low Speed Following control is deactivated, as shown in FIG. 10 (EX. 8). Thereafter, even if the "parking range switching request" is generated, no braking based on the "parking range switching request" is performed. This is because the driver has deactivated the Low Speed Following control based on the driver's will for start, and thus it is considered not necessary to brake the wheels. This enables a driving motion according to the driver's will for start even if the "parking range switching request" is generated.

Figure 11:
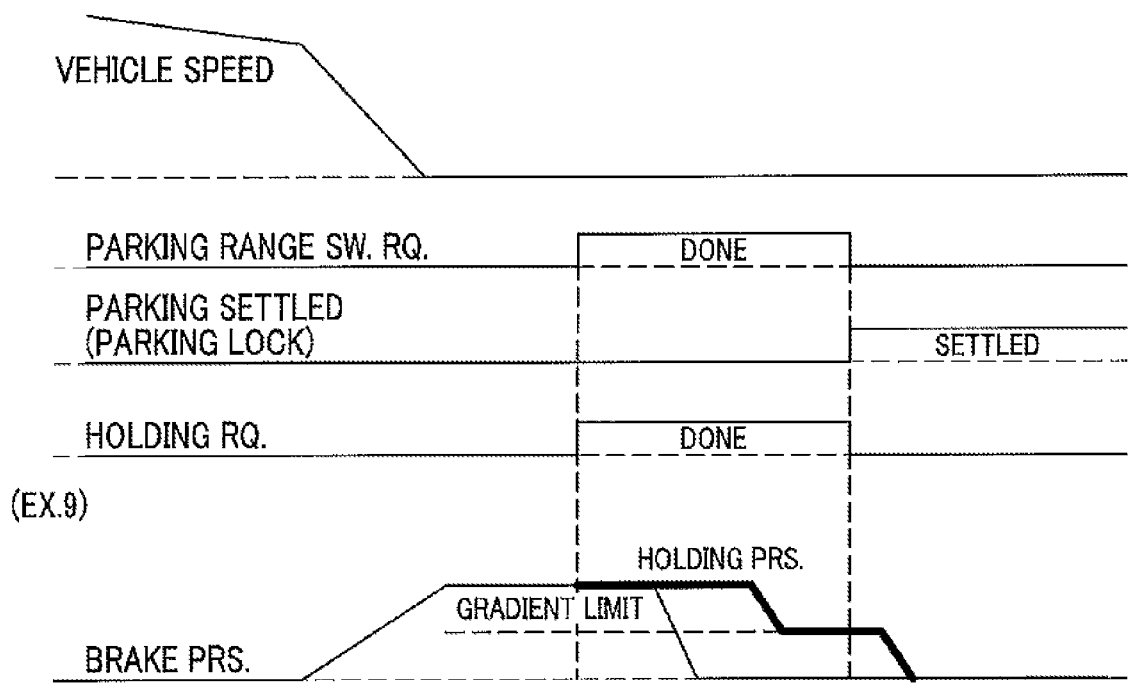
FIG. 11 is a chart representing an example of the relationship between a parking range switching request and a two-step brake control by the vehicle control device.

(Step-by-Step Braking: FIG. 11)

The example in FIG. 11 represents the case where the driver steps on the brake pedal during running of the vehicle on a hill to stop the vehicle, and then depresses the parking switch 102 while stepping on the brake pedal, to make the "parking range switching request" done, thereafter although the driver releases the brake pedal, a holding pressure which is triggered by the "holding request" triggered by the "parking range switching request" is kept, and then two-step holding pressure restriction is performed during switching to the parking range.

This two-step holding pressure restriction is for the purpose of removing a feeling of strangeness by a pitching when releasing the holding, and of reducing a power for brake pressure holding.

The chart shows a brake pressure (thin line) based on the operation of the brake pedal by the driver, and a holding pressure (thick line) of the brake which is triggered by the "holding request" according to the "parking range switching request".

As illustrated in FIG. 11, the control unit 82 of the ECU 80 performs the two-step holding pressure restriction according to a hill gradient which is detected by a G sensor not shown, in order to remove the feeling of strangeness by the pitching at the holding release. Namely, when braking the wheels at the same timing of the "holding request" as that of the "parking range switching request", the control unit 82 of the ECU 80 supplies a two-step control signal to the electric motor 72 of the motor cylinder device 16, and in turn the electric motor 72 of the motor cylinder device 16 actuates the disc brake mechanisms 30a to 30d, using a two-step brake fluid pressure generated, and brakes the wheels.

By this operation, the two-step holding pressure restriction according to the hill gradient is performed and the pitching is reduced to remove the feeling of strangeness given to the driver.

The plurality of embodiments described above represent the examples of embodying the present invention. Accordingly, the technical scope of the present invention should not be construed to a limited extent by these embodiments, because the present invention can be put into practice by way of various forms without departing from the gist thereof or principal features thereof.

For example, in the above embodiments, it is described that "the braking according to the holding request generated at the parking range switching request" according to the embodiment of the present invention is realized by the motor cylinder device 16. However, the braking is not necessarily given by the motor cylinder device 16, and may be given by the VSA (Vehicle Stability Assist) device 18 or the EPB (Electronic Parking Brake) motor 74, under control of the control unit 82 in the ECU 80. Alternatively, the braking may be given by both the VSA device 18 and the EPB motor 74, or an arbitrary actuator, under control of the control unit 82 in the ECU 80.

Moreover, in the above embodiments, it is described that "the braking according to the holding request generated at the parking range switching request" is realized by the actuator (in this case, the motor cylinder device 16) common to the respective brakings of Hill Start Assist control, Automatic Brake Hold control and Low Speed Following control. However, each braking does not necessarily use the common actuator, and can use an arbitrary actuator different from the other.

More specifically, although in the above embodiments, the respective brakings of Hill Start Assist control, Automatic Brake Hold control and Low Speed Following control are realized by the motor cylinder device 16 or the VSA device 18, they do not necessarily use these actuators. The respective brakings may be given by the EPB motor 74 under control of the control unit 82 in the ECU 80, or may be given by a plurality of actuators or an arbitrary actuator under control of the control unit 82 in the ECU 80.

REFERENCE SIGNS LIST

7 Braking force control system
16 Motor cylinder device
80 ECU
82 Control unit (Acceptance unit)
100 Shift-by-wire device
101 Shift device
120 Speed change control device
132 Automatic transmission

What is claimed is:

1. A vehicle control device comprising:
   a shift-by-wire device which switches a shift range of a transmission mounted on a vehicle in accordance with a request by an electric signal;
   an acceptance unit which accepts a request for switching to a parking range of the transmission;
   a detection unit which detects that switching to the parking range of the transmission has been settled; and
   a braking device which generates a braking force when the acceptance unit accepts a request for switching to the parking range of the transmission, from the time of acceptance of the request for switching until the detection unit detects settlement of the switching to the parking range.

2. The vehicle control device according to claim 1, wherein the braking device generates the braking force for a predetermined time, and decreases the braking force when the predetermined time elapses even if the detection unit does not detect the settlement of the switching to the parking range.

3. The vehicle control device according to claim 1, wherein in operation of a hill start assist control that generates a braking force for a predetermined time while the vehicle is stopping on a hill, the braking device continues generation of the braking force after elapse of the predetermined time when the request for switching to the parking range is done based on the request.

4. The vehicle control device according to claim 1, wherein in operation of an automatic brake hold control that generates a braking force while the vehicle is stopping, the braking device generates a braking force based on the automatic brake hold control when the request for switching is done.

5. The vehicle control device according to claim 1, wherein in operation of a low speed following control, even when the acceptance unit accepts a request for switching to the parking range of the transmission, the braking device does not generate a braking force based on the request for switching.

6. The vehicle control device according to claim 1, wherein the braking device holds the braking force at a first predetermined pressure and then holds the braking force at a second predetermined pressure lower than the first predetermined pressure.

* * * * *